July 20, 1926.  1,593,049
C. W. TARBET
MACHINE FOR MOLDING WINDOW WEIGHTS OR SIMILAR ARTICLES
Filed Jan. 29, 1923   3 Sheets-Sheet 1

Witness
W. K. Olson

Inventor:
Clarence W. Tarbet
By Harry Irwin Romer
Atty.

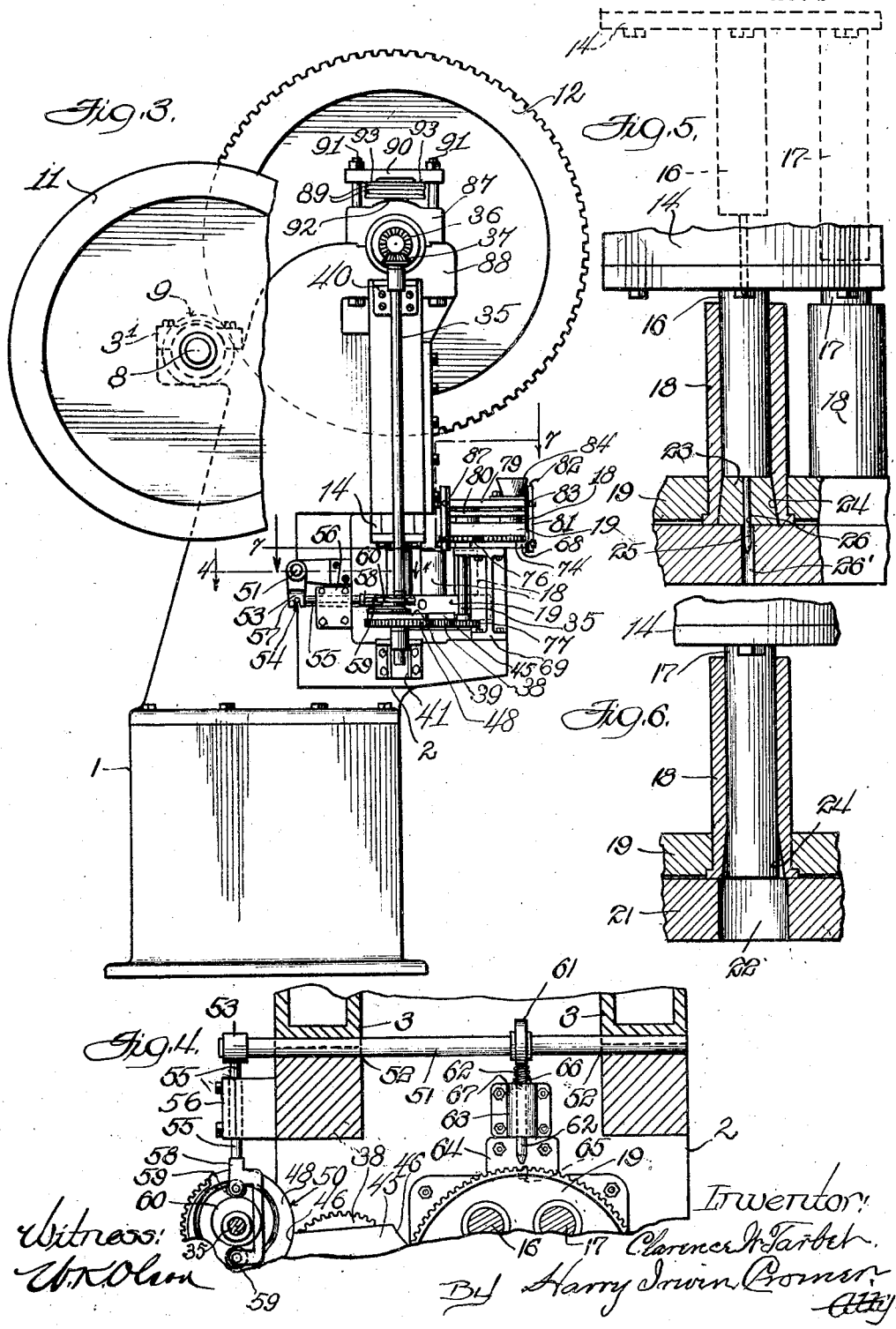

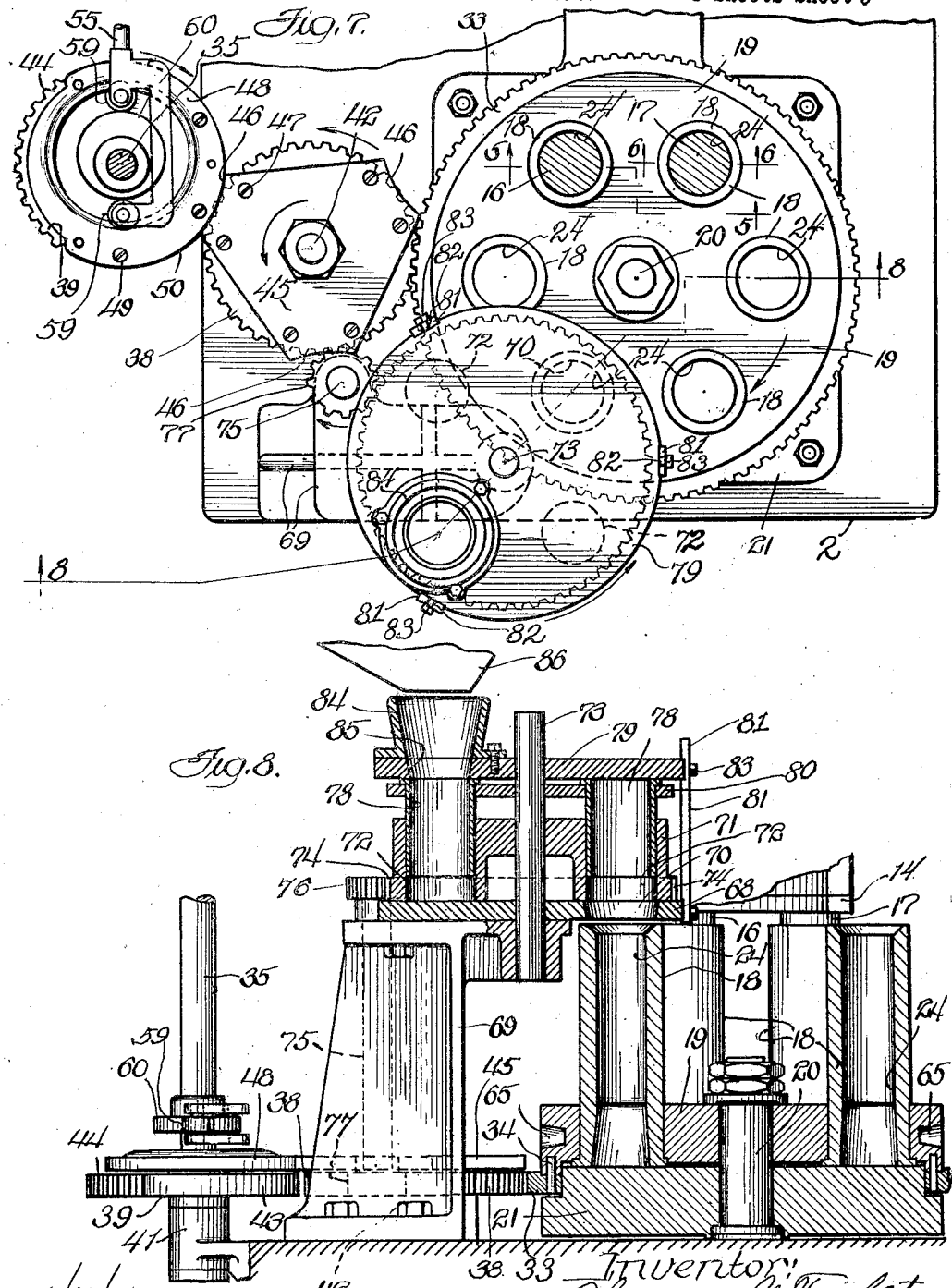

Patented July 20, 1926.

BEST AVAILABLE COPY 1,593,049

UNITED STATES PATENT OFFICE.

CLARENCE W. TARBET, OF CHICAGO, ILLINOIS, ASSIGNOR TO UNIT WINDOW WEIGHT COMPANY, OF CHICAGO, ILLINOIS, A CORPORATION OF ILLINOIS.

MACHINE FOR MOLDING WINDOW WEIGHTS OR SIMILAR ARTICLES.

Application filed January 29, 1923. Serial No. 615,613.

This invention relates to that class of machines for molding or forming window weights or similar articles, having one or more molds or mold chambers, and provided with plunger and plunger-operating mechanism adapted to apply the necessary pressure for compressing a composition or material of which the window weights or other articles are to be formed, and means for discharging the molded articles from the mold chambers.

The principal object of the invention is to provide a simple, economical and efficient machine for molding or forming composition window weights, or similar articles.

Other and further objects of the invention will appear from the following description and claims, and from an inspection of the accompanying drawings.

The invention consists in the features, combinations, details of construction and arrangements of parts and in composition window weights and the method of making the same, herein described and claimed.

Fig. 3 is a view in side elevation of the machine shown in Fig. 1, as it would appear when viewed from the left side of said figure;

Figure 1:
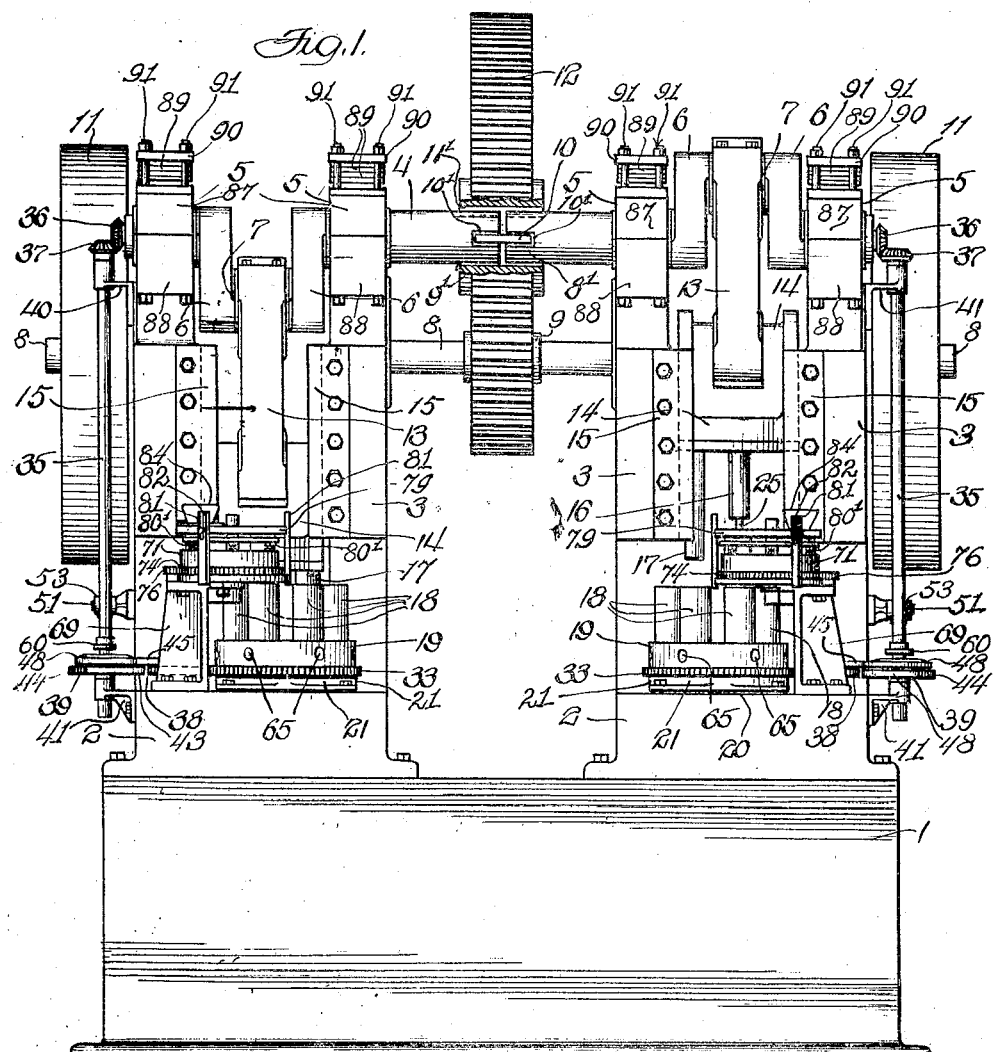
Fig. 1 is a view in front elevation of a machine for making window weights or similar articles, constructed in accordance with my invention.

Fig. 4 is an enlarged view in horizontal section taken on line 4—4, of Fig. 3, looking downward and showing a part of the locking and releasing mechanism whereby the turntable or movable support upon which the molds are mounted is secured and accurately held in the proper positions successively for enabling material to be introduced into and compressed in the molds and discharged therefrom successively and progressively;

Fig. 5 is an enlarged view in detail showing a portion of the mold-supporting turntable and one of the molds thereof in vertical section, taken on line 5—5 of Fig. 7 and with the compresser plunger,—shown in full lines in front elevation,—extending into the mold chamber and in engagement with the material to be compressed or molded in and discharged from such chamber. Said figure also shows a discharging plunger extending into a mold and both in front elevation;

Fig. 6 is a similar view showing one of the molds in central vertical section in discharging position, and with the discharging-plunger in lowered position in said mold, as it would appear in the operation of discharging a window weight or mold section, said figure being taken on line 6—6 of Fig. 7, as indicated;

Fig. 7 is an enlarged detail plan view of one of the mold-supporting turntables or rotary mold supports, and also shows a portion of the mechanism for rotating the turntable or series of molds, and for stopping and releasing the turntable and molds in such a manner as to permit the molds to be moved intermittently or in a step by step manner into position to enable material to be introduced into each mold successively and compressed and discharged while the mold is stationary and in proper position, and adapted to permit the intermittent movement of each turntable and its molds while the corresponding plunger mechanism is in raised position and out of engagement with the molds, and while the opposite turntable and its molds are stationary. And said figure also shows an improved means for measuring and feeding material into the molds in successive order; and Fig. 8 is a view in central vertical section taken on line 8—8, of Fig. 7, looking in the direction indicated by the arrows approximately, but showing the parts which are shown in elevation as they would appear when viewed at different angles as compared with the angles or directions from which the parts shown in section are seen, as indicated by the irregular line 8—8; but Fig. 8 shows the parts on a slightly reduced scale as compared with Fig. 7.

In constructing an improved machine for making or molding compressed composition window weights or similar article in accordance with my invention, I provide a frame or base 1, upon which is rigidly mounted a pair of upright side frame members 2, 2, each of which comprises a pair of upright columns or frame members 3, 3, which form supports for a plunger-operating shaft 4, which is journaled in suitable bearings 5 in said upright columns or frame members 3.

The plunger-operating shaft 4 is, by preference, in the form of a crank shaft, having two pairs of crank arms 6 near the opposite extremities of said shaft, each pair of said crank arms being provided with a connecting wrist pin or crank pin 7.

The plunger-operating shaft 4 is operatively connected with suitable driving means, such, for example, as a main drive shaft 8 journaled in suitable bearings 3, in uprights 3, and operatively connected with the shaft 4 by means of a spur gear wheel 9 fixed to said main drive shaft and in toothed engagement with the gear 12. Fly wheels 11 are fixed to the shaft 8 which is thus adapted to be connected with any suitable source of power or driving means.

I prefer to make the shaft 4 in two separable sections, their inner abutting ends 8' and 9' being separably connected by suitable means, such, for example, as a connecting key 10 mounted in end slots 10' and adapted to connect and cause said sections to rotate together, but permit either or both of said sections to be tilted or dislodged from its normal operative position in its bearings without distortion or injury to either of the sections of the shaft or to the other parts of the machine. It is very desirable to enable the sections of the shaft to be so mounted and supported in suitable bearings hereinafter described, as to provide means for relieving the stresses and strains to which said shaft and the plunger mechanism and molds, or other machine parts, are subjected in use, to prevent injury or breakage. For example, the construction and arrangement of parts herein described and shown including the separably connected shaft sections and bearings or supports therefor, are adapted to relieve the stresses and strains to which the parts are subjected in use whenever such stresses and train become excessive, or greater than can be safely sustained by the machine or parts without danger of injury or breakage.

The spur gear wheel 12 is fixed to and connects the inner abutting ends of the separable sections forming the shaft 4, and has an axial opening 11' into which the abutting ends of said shaft sections extend. Connected with each crank 6 is a plunger-operating reciprocating rod or pitman 13. And said cranks are so disposed that the crank and its wrist pin 7 on one side of the gear wheel 12 and machine will be down and directly beneath the axial center of the shaft 4 and at the lower extremity of the path of movement of such crank while the other crank is up and at the upper extremity of its path of movement, and vice versa.

Operatively connected with each plunger-operating rod or pitman 13 is a reciprocating plunger comprising a plunger-head 14, which is slidably mounted between opposite parallel ways or guides 15 located on opposite sides of each plunger head, respectively, and adapted to guide the latter in a vertical path of movement.

Each plunger head 14 is located directly beneath the axial center of the plunger-operating crank shaft 4 and is provided with a compressor-plunger 16 and a discharging plunger 17 fixed thereto. And each compressor-plunger and discharging plunger is located directly over the path of movement of a series of molds 18 mounted upon a movable support which is, by preference, in the form of a rotary turntable or bed 19.

I prefer to employ a plurality of mold-supporting turntables or movable mold supports 19, one for each compressor plunger 16 and plunger operating pitman and plunger head, and to mount a set or series of upright molds 18 in a circular row and equally spaced apart upon each turntable 19, or in such position upon a movable support that the molds are caused to travel or revolve intermittently or in a step by step manner in a path of movement which will bring each mold in its proper successive order directly beneath the compressor-plunger and discharging plunger, respectively, in succession, or in a desired predetermined order. The set of molds on one side of the machine will thus be held stationary during the operation of compressing the material in one mold of such set, and simultaneously discharging a molded article from another mold of such set, while the set of molds on the opposite side of the machine are being rotated or moved from one plunger-receiving or operative position to another, with the corresponding compressor-plunger and discharging plunger above the level of the path of movement of the molds and in position to permit the movement of the latter intermittently as required.

Each turntable 19 is provided with a vertical spindle or axle 20, and is rotatively supported upon a suitable stationary support or bed 21, having a discharge opening 22 located directly below the level of the path of movement of the corresponding upright molds 18. (See Fig. 6.) These discharge openings 22 are each in position to receive and deposit or discharge into a suitable shute or receptable, not shown, the composition window weights or molded window weight sections 23, or other articles, as they are discharged from the mold chambers 24 or molds 18, successively, by the operation of the corresponding discharging plunger 17, or by said plungers 17 acting alternately on opposite sides of the machine, or acting to discharge the compressed molded articles from the molds in the desired predetermined order. (See Figs. 3, 5, and 6.)

Each compressor-plunger 16 is provided with a central or axial depending piercing member, pin or core member 25 fixed to and projecting downward beyond the bottom end and inner end compression surface of the compressor plunger 16 and adapted to be forced through the material to be molded and compressed in any mold chamber 24 or mold 18 in which such plunger is caused to operate, so as to form an axial opening 26 in and through each window-weight or window-weight section 23. (See Figs. 1 and 5.)

A vertical opening 26' is provided in the stationary bed 21, for receiving the bottom extremity of said pin 25 of the corresponding compressor plunger, when such plunger is in lowered or compressing position in a mold containing material to be compressed and molded.

Figure 2:
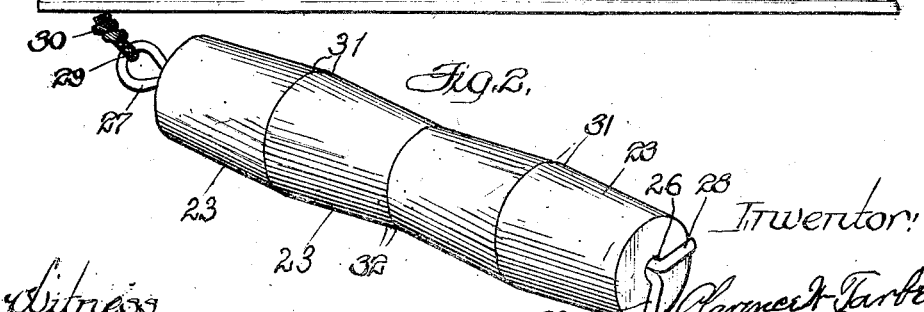
Fig. 2 is an enlarged detail view in perspective of an improved sectional composition window weight made in accordance with my invention.

A connecting and supporting rod or wire 27, adapted to extend through the axial openings 26 in any desired number of composition window-weight sections 23 to be connected and supported thereby, so as to form a window-weight consisting of comprising any desired number of connected sections 23, and of any desired predetermined weight and length or dimensions, is provided and inserted through the central openings in any desired number of sections 23, so as to form a sectional window-weight consisting of any desired number of sections connected by such rod. (See Fig. 2.)

The rod 27 is provided at one end with any ordinary or suitable means for securely holding the threaded or connected sections 23 on the rod, such, for example, as one or more angular bent end portions 28, or other suitable or equivalent securing means adapted to engage the bottom section 23, or any desired one or more of such sections or window-weight members to be supported on such rod or wire. Each rod or wire 27 has a loop or eye 29, or similar element adapted to be secured to a window cord 30, or similar means for suspending or supporting the window weight.

Each window-weight thus comprises a series of connected tapered or truncated-cone shaped sections 23, formed of a suitable composition or material molded or compressed and molded as described.

These window-weight sections 23, which are, by preference, tapered or truncated-cone shaped, are, by preference, so arranged and threaded upon the central core or rod 27 that the relatively large ends 31 of adjacent sections 23 are in abutting engagement with each other, and the relatively small end 32 of each section 23 is either in abutting engagement with an opposed small end 32 of an adjacent section of the same window-weight or in position to form a tapered exposed end of a window-weight comprising a plurality of such connected truncated-cone shaped or tapered sections. (See Fig. 2.) The sectional window-weight thus formed has slightly tapered or truncated-cone shaped upper and lower end portions or extremities adapted to enable the weight to move freely between guides or in ways, and without being stopped by obstructions.

Suitable means is provided for supporting and intermittently rotating, and stopping, locking and releasing each of the turntables 19, with the molds supported thereby, as required, as follows:

A toothed annular rack or gear 33 is fixed to each turntable 19 by means of pins 34; and a shaft 35 is connected with each gear 33 by means of a suitable train of gears and suitable locking and releasing or escapement mechanism adapted to rotate the turntable 19 intermittently or in a step by step manner while permitting shafts 35 to be rotated continuously.

The upper end of each shaft 35 is operatively connected with the plunger-operating crank shaft 4 by means of a bevel gear wheel 36 fixed to the corresponding end of said crank shaft, and a bevel pinion 37 fixed to said upper end of the shaft 35 and in toothed engagement with such spur gear wheel 36, or by similar or equivalent connecting means.

Each shaft 35,—there being one of such shafts for each turntable 19 and said shafts being located on opposite sides of the machine,—is operatively connected with the corresponding toothed rack or gear 33 and turntable 19 by means of an intermediate gear wheel 38, which is in toothed engagement with said gear wheel 33 on the corresponding turntable, and in toothed engagement with a segmental gear 39, which is fixed to the lower end of the corresponding shaft 35, each of said shafts 35 being journaled in suitable bearings 40, 41, on opposite sides of the main frame of the machine.

The gear 38 is mounted upon upright stub shaft 42, as shown in Figs. 7 and 8. The segmental gear 39 has a smooth or non-toothed segmental peripheral portion 43, which is out of engagement with the intermediate toothed gear 38, and has a toothed peripheral portion 44, which is adapted to operatively engage the teeth of the gear 38 during each revolution of the shaft 35.

An angular escapement member 45, having three segmental curved recessed portions or recessed teeth 46, is fixed to the intermediate gear wheel 38 by means of securing screws 47 or other suitable securing means; and a curved segmental escapement member 48 extends along the non-toothed periphery of and is secured to the segmental toothed gear 39. Securing screws 49, or other suitable securing means, may be employed for this purpose. The peripheral curved margin 50 of said segmental escapement member 48 is adapted to extend into and to operatively engage each curved recessed portion 46 in the adjacent escapement member 45, successively, as the intermediate gear 38 and angular escapement member 45 are rotated intermittently or in a step by step manner. The constantly rotating shaft 35 and segmental locking escapement member 48 are thus adapted to rotate the intermediate gear 38 and escapement member 45 intermittently, and thus cause the corresponding turntable 19 and a series of molds 18 thereon to be rotated intermittently or in a step by step manner. Each turntable is thus securely locked upon the completion of each intermittent movement thereof, in position to permit the corresponding pressure and discharging plungers to be operated while each turntable is in proper position; and each turntable is rotated intermittently while the opposite turntable is stationary, and vice versa.

A supplementary or auxiliary securing or locking and releasing means is provided for each turntable 19, by means of which each of said turntables is accurately locked in exactly the proper stationary position at the proper moment to permit the pressure and discharging plungers to operate and to permit each turntable to be released and rotated intermittently, as desired.

For this purpose a pair of rock shafts 51 are journaled in suitable bearings 52, on opposite sides of the machine frame, each adjacent to a corresponding turntable 19 to be secured and released alternately. Each shaft 51 is provided with a crank arm 53, having an elongated slot 54 in its bottom extremity. And a reciprocating connecting rod or plunger 55 is slidably mounted in a suitable stationary support 56, one end of said rod 55 being provided with a transverse pin 57 fixed thereto and slidable in the slot 54 in the bottom forked end of the crank arm 53, and the other or forked end 58 of said reciprocating rod 55 being provided with one or more anti-friction rollers 59 thereon and in operative engagement with the periphery of an eccentric 60, which is fixed to the shaft 35, already described.

Each rock shaft 51 is also provided with a depending crank arm 61, fixed thereto. And a reciprocating rod or locking pin 62 is pivotally or flexibly connected with the lower extremity of said crank arm 61, and slidably mounted in a suitable bearing or socket 63, in position to extend into and out of securing engagement with peripheral openings or recesses 65 in the adjacent turntable 19 successively. (See Figs. 3 and 4.)

A compressible spring 66 encircles the locking-pin 62, and is mounted in a suitable recess 67 in the bracket 63, in position to yieldingly resist the movement of the locking-pin in the direction of the turntable 19, and tend to press the locking-pin out of locking engagement with the turntable and to hold the anti-friction roller 59,—by means of which the crank arms 53 and 61 and locking-pin 62 are moved toward or into locking engagement with the turntable 19,—inoperative engagement with the eccentric 60.

The eccentrics 60, located on opposite sides of the machine, are set in such position with respect to each other, that when the locking-pin 62 on one side of the machine is in locking engagement with a peripheral socket or recess 65 of the corresponding turntable 19, the locking-pin 62 on the opposite side of the machine will be out of locking engagement with the adjacent turntable, and vice versa.

From the foregoing it will be readily understood that the turntable operating means and locking and releasing mechanism, above described, is adapted to rotate each of the turntables 19 intermittently or in a step by step manner; and the turntables are rotated alternately with respect to each other and are each automatically locked and held stationary during the operation of introducing material into the molds and compressing and discharging molded material from the molds, and while the opposite turntable is being rotated, and vice versa.

In order to provide simple and efficient means for automatically measuring and feeding or introducing material into the molds in the desired quantities and at the proper intervals, I provide an expansible and collapsible intermittently rotative measuring and feeding device which is, by preference, constructed as follows:

A stationary base 68 is mounted upon a suitable support, which may be in the form of an upright bracket 69 fixed to the machine frame. The base 68 is provided with a discharge opening 70 located in position to discharge material into the adjacent mold chamber 24 of each mold 18 on the corresponding turntable 19, successively, as the molds are rotated intermittently.

A rotary feed table 71, having expansible and collapsible measuring chambers or compartments 72 located at equal distance from each other and from the axial center of the feed table, is rotatively mounted upon an upright axle or shaft 73, the bottom end of which is anchored in the base 68 and supporting bracket 69. The rotary feed table 71 is provided with a peripheral toothed rack or gear 74 fixed to and extending entirely around the periphery of said feed table. And an upright feed table operating shaft 75 is journaled in suitable bearings in the upright bracket 69 or other suitable support and is operatively connected with the feed table 71 by means of a spur gear wheel 76 fixed to the upper end of said shaft and in toothed engagement with the gear 74 and a spur gear wheel 77 fixed to the lower end of said shaft 75, and in toothed engagement with the intermittently rotative toothed gear wheel 38, already described. (See Figs. 7 and 8.)

Each measuring and feeding chamber 72 is provided with a telescoping upper cylindrical tubular portion 78 attached to and depending from an intermittently rotative upwardly and downwardly adjustable supporting member or plate 80, located between a stationary top plate or hopper-supporting frame member 79 and the stationary base 68, already described. A series of adjusting screws 80' serve to raise and lower the plate 80 and to support it in any desired adjusted position. And the plate 80 serves to lift or carry with it the upper telescoping tubular members 78, so as to increase or decrease the effectual length and capacity of the measuring chambers 72, as desired.

Suitable means is provided for securing the upwardly and downwardly adjustable non-rotative top plate or hopper support 79 in any desired adjusted position. For this purpose a plurality of upright standards or frame arms 81 are fixed to the outer margin of the stationary base 68, already described, and are each provided with an elongated slot 82 in the upper end thereof. And a headed securing-screw 83 is anchored in the upwardly and downwardly adjustable hopper support 79. Each screw 83 extends through a slotted upper end portion 82 of a corresponding upright 81. The members 79 and 80 and upper collapsible tubular members 78 are thus supported in any desired adjusted position with respect to the rotary feed table 71 and stationary base 68.

A feeding hopper 84 is fixed to the hopper support 79, already described, and said hopper support 79 is provided with a supply passage or opening 85 leading from the bottom of said hopper in position to discharge material from said hopper into each tubular chamber or member 78 in successive order, as said tubular members are rotated with respect to said hopper, and with respect to said stationary hopper support 79.

The hopper 84 is, of course, mounted in position to receive material discharged from a supply shoot or hopper 86, which may be of any desired ordinary and well known or suitable form of container, or supply conduit.

From the foregoing it will be readily understood that the hopper 84 and rotative feed table 71 are adapted to measure and discharge material into each of the molds 18 of the corresponding or adjacent series of such molds during the intervals of time in which the molds are stationary. And the molds are thus each successively charged with the proper quantity of material to be compressed or molded therein.

In order to provide a simple and efficient safety device, or means for preventing injury to the machine, in case of the mechanism being subjected to excessive stresses and strains from any cause, the journal bearings in which the plunger-operating crank shaft is journaled, are each provided with a spring-pressed bearing member 87 which is held in operative engagement with its mating bearing member 88, by means of heavy springs 89, which are interposed between the top plate or stationary member 90 and said journal bearing member 87. The top frame member or plate 90 is firmly secured in operative position and in engagement with the upper extremity of the corresponding spring by means of headed bolts 91, which are anchored in corresponding stationary bearing members 88, and extend through suitable openings in said top plate so as to hold the top bearing 87 in its proper operative position under all normal conditions or at all times when the machine is in operation and the members subjected to normal stresses and strains which are present during the operation of the machine under normal conditions, but so as to permit the top bearing member 87 to be pressed upward against the tension of the corresponding spring when the stresses or strains upon the plunger-operating crank shaft and its bearings become so excessive as to render the mechanism liable to injury, as the result of such excessive stresses and strains.

In making composition window weights in accordance with my invention, the mold chambers on opposite sides of the machine are charged with material to be compressed or molded in such chambers successively and intermittently, first charging a mold chamber on one of the turntables, and then, while compressing or molding the material in such chamber, simultaneously charging a mold chamber on the other turntable, and vice versa. Having charged one or more of the mold chambers on a given turntable and caused the charged mold to be moved into position directly beneath the corresponding compressor-plunger 16, the plunger is forced down into the mold compressing the material contained therein, and the mold containing the compressed material is then moved automatically into position directly beneath the discharging-plunger 17—as shown in Fig. 7,—thus causing the next successive charged mold to be moved into position beneath the compressor-plunger. The compressor-plunger and discharging-plunger are then operated simultaneously so as to cause material to be compressed in one of said mold chambers while the compressed window weight or molded article in the other mold chamber is being discharged. While material is being compressed in one of the mold chambers, and the compressed or molded article is being discharged from another mold chamber on a given turntable, the opposite turntable is rotated intermittently so as to bring the molds of such last-mentioned turntable into proper position with respect to the corresponding compressor-plunger and discharging-plunger, and vice versa.

In making composition window weights in accordance with my invention, I provide a suitable quantity of material to be operated upon. And for this purpose any desired material may be employed which is suitable for being compressed or molded and used in making the window weights or other articles to be produced.

A very desirable composition, which I have found suitable for making composition window weights in accordance with my invention, consists substantially of the following elements in the proportions indicated, by weight:—

Four (4) parts metal borings, or similar finely divided metal; five (5) parts slag in a finely divided condition, and one (1) part Portland cement. Total ten (10) parts.

I first provide a suitable quantity of iron borings, or similar finely divided particles of metal, which are saturated with water, by preference, all the water that the borings or finely divided metal will absorb or retain. For this purpose four (4) parts of iron bearings and five (5) parts of slag, which are thoroughly intermixed and then saturated with all the water that said elements will absorb or retain. I then add cement, by preference Portland cement in dry form in substantially the proportions of one (1) part cement to nine (9 or more parts of intermixed iron or similar borings or finely divided particles of metal or mineral and slag.

The elements including this cement and finely divided particles of metal and slag are then thoroughly intermixed, and placed in suitable molds, such for example as the molds above described and forming part of a machine, such as that herein above described, and then subjected to a pressure which may vary. A suitable pressure for the purpose, however, as has been found in practice, may vary according to the character and condition of the material to be compressed or molded, and according to varying circumstances. A pressure of from 30,000 to 65,000 pounds per square inch of surface of the compressing face of the compressor plunger has been found in practice to produce very satisfactory results. But a greater pressure, for example 150,000 pounds per square inch—or more—is much more satisfactory and will produce very good results even with dry material and no cement in the composition or material to be compressed or molded. And a pressure of considerably less than 30,000 pounds per square inch may be employed under some circumstances, for example, when sufficient cement is used, or when the condition of the material operated upon is such as to enable satisfactory results to be obtained with less than 30,000 pounds pressure per square inch of exposed surface of the material operated upon, or of pressure surface of the piston.

It is important that the mold chamber should be tapered, and materially wider at or in the direction of the discharging end of the chamber than at the receiving end or end into which the piston is inserted. In other words, the mold chambers are each progressively wider from end to end of the chambers respectively, in the direction of the downward or compressing movement of the compressor plunger, the side walls of the chambers being, by preference, progressively wider apart in the direction of the lower or discharging ends of the chambers, respectively, so that each chamber is tapered or truncated-cone shaped, and has downwardly and outwardly inclined side walls which are adapted to permit the material contained in the mold chamber to be readily forced downward in all parts of the mold chamber from the relatively narrow upper or receiving end to the lower or discharging end of the chamber. The frictional resistance afforded by the side walls of the mold chamber to the movement of the material in the mold chamber to a closely compressed and condensed condition, is thus reduced to a minimum, and the particles of material in contact with or adjacent to the peripheral walls of the mold chamber are permitted to move without being subjected to unnecessary frictional resistance by the mold chamber walls. The particles of material contained in the mold chamber are thus permitted to move into compact, closely compressed or condensed condition in all parts of the mold chamber, thus forming a compressed, closely condensed, heavy composition window weight, or other article, all parts of which are in uniformly compressed and condensed adhesive engagement or contact, and of the desired uniform density, weight, and degree of hardness. The mass of material thus compressed and molded by being subjected to pressure in a mold adapted to enable the pressure to act upon the particles of material throughout all parts of the mold, is of greater density throughout all parts of the compressed and molded article; and the composition or compressed and condensed material is homogenous and of more uniform density than can be obtained by the same pressure without such a tapered mold.

The material is, by preference, subjected to the desired degree of pressure in the mold while the material is only partially saturated with water or liquid, and while said material to be compressed is in a finely divided condition and without sufficient water to completely saturate the cement,— or other finely divided material either with or without cement—or to completely hydrate the cement. Pressure is thus applied and the mixture or composition is compressed while without sufficient moisture to cause the cement to completely set, or to completely hydrate or saturate the finely divided material or cement.

After the pressure has been applied and removed, the compressed material or composition is removed from the mold, and may be allowed to dry. In cases in which cement is contained in the compressed material, the cement is allowed to dry and set; or it may be allowed to first partially dry by being allowed to stand for a suitable predetermined period of time, for example, from six to twenty-four hours more or less according to circumstances and the character and conditions of the material, thus allowing the cement to partially set, and then again moistening the material to a sufficient extent to completely saturate the cement, or to any desired extent, and then allowing the material to dry and the cement to set.

While I have described materials or elements and a process or method of treating the same, by means of which a composition suitable for making window weights, or other articles, may be produced and compressed or molded, in accordance with my invention, and have described a composition which has been found in practice to give very satisfactory results, I contemplate the employment of the elements mentioned or similar or equivalent materials in proportions which may vary under varying conditions and circumstances. And the machine herein described and claimed is, of course adapted to be used for compressing and molding or operating upon any desired suitable material, and for producing any desired articles or products. And I do not confine or limit the scope of the invention or inventions herein described and claimed, in any respect otherwise than as set forth in the claims.

And, although one of the principal objects to be accomplished by the use of the heavy flat springs 89 and the spring-pressed bearing members 87 is to prevent injury or breakage and to relieve or avoid excessive stresses and strains upon the machine or its parts, it will be readily understood that said springs 89 and spring-pressed journal bearing members 87, being constructed and arranged as shown and described, and with a central shoulder or boss 92 on each bearing member 87 in engagement with the face of the bottom one of a corresponding set of spring members 89, and with side shoulders or bosses 93 on each top plate 90 in contact with the side marginal portions of the top spring member 89 of the corresponding set of said springs or resilient means, a pressure-regulating means is thus obtained whereby any desired predetermined pressure may be obtained, and whereby the compression and density of the material operated upon can be controlled and regulated by regulating and controlling the tension of the springs or resilient means.

In order to accomplish this, it is only necessary to provide springs 89 of suitable dimensions and strength to yieldingly hold the journal bearing members 87 in operative engagement with the journal portions of the shaft 4 in such a manner as to permit but yieldingly resist the desired slight tilting or upward movement the shaft or a part of the same, whenever the desired predetermined degree of pressure upon the material operated upon has been reached or obtained, and not until such desired degree of pressure has been reached or exceeded.

The bolts 91, with the nuts 94 in threaded engagement therewith, as shown in Figs. 1 and 3, provide convenient means for controlling and regulating the tension of the springs 89 or resilient means. And it is obvious that the bolts and nuts thus employed in connection with the resilient means and yielding journal bearing parts, are adapted to serve as a safety device, being of sufficient strength to sustain the stresses and strains to which the parts are subjected under normal conditions in use, even though the strains upon the parts are sufficient to cause the springs to yield to the desired extent, but said bolts and nuts being so constructed and connected as to yield or break and relieve the stresses and strains upon the shaft 4 or other parts, when such stresses and strains exceed normal requirements to an extent which will render the machine or some of its parts liable to injury or breakage.

I claim:

1. In a machine of the class described, the combination of a mold forming a mold chamber, a reciprocating compressor plunger movable into and out of said mold chamber and adapted to compress material contained in said chamber, a piercing member fixed to and projecting beyond the end and inner end compression surface of the compressor plunger and adapted to extend through the material in the mold chamber to form a perforation through said material, means for operating said plunger, and discharging means operatively connected with said plunger and adapted to discharge compressed material from said mold chamber.

2. In a machine of the class described, the combination of a mold forming a mold chamber, a reciprocating plunger head, a compressor plunger and a discharging plunger both fixed to said plunger head and supported thereby in fixed relation to each other, said compressor plunger being movable into and out of said chamber and adapted to compress material contained in the same, a piercing member fixed to and projecting beyond the end and inner end compression surface of the compressor plunger and adapted to extend through the material in the mold chamber to form a perforation through said material, and means for introducing said plungers into said mold chamber successively.

3. In a machine of the class described, the combination of a mold forming a mold chamber, a reciprocating plunger head, a compressor plunger and a discharging plunger both fixed to said plunger head and supported thereby in fixed relation to each other, said compressor plunger being movable into and out of said chamber and adapted to compress material contained in the same, a piercing member fixed to and projecting beyond the end and inner end compression surface of the compressor plunger and adapted to extend through the material in the mold chamber to form a perforation through said material, means for operating said plunger head, and supporting means adapted to movably support said mold chamber in position to receive said plungers successively.

4. In a machine of the class described, the combination of a mold movably mounted and provided with a mold chamber, a reciprocating plunger head, a compressor plunger and a discharging plunger both fixed to said plunger head and supported thereby in fixed relation to each other, said compressor plunger being movable into and out of said mold chamber and adapted to compress material contained in the same, a piercing member fixed to and projecting beyond the end and inner end compression surface of the compressor plunger and adapted to extend through the material in the mold chamber to form a perforation through said material, means for operating said plunger head, and means for moving said mold chamber into position to receive said plungers successively.

5. In a machine of the class described, the combination of a movable mold forming a mold chamber, a reciprocating plunger head, a compressor plunger and a discharging plunger both fixed to said plunger head and supported thereby in fixed relation to each other, said compressor plunger being movable into and out of said mold chamber, a piercing member fixed to and projecting beyond the end and inner end compression surface of the compressor plunger and adapted to extend through the material in the mold chamber to form a perforation through said material, a plunger-operating shaft rotatively mounted and operatively connected with said plunger head, and means for moving said mold chamber into position to receive said plungers successively.

6. In a machine of the class described, the combination of a mold forming a mold chamber, a reciprocating plunger head, a compressor plunger and a discharging plunger both fixed to said plunger head and supported thereby in fixed relation to each other, said compressor plunger being movable into and out of said mold chamber, a piercing member fixed to and projecting beyond the end and inner end compression surface of the compressor plunger and adapted to extend through the material in the mold chamber to form a perforation through said material, a plunger-operating shaft rotatively mounted, operatively connected with said plunger head, and supporting means adapted to movably support said mold chamber in position to receive said plungers successively.

7. In a machine of the class described, the combination of a mold movably mounted and forming a mold chamber, a reciprocating plunger head, a compressor plunger and a discharging plunger both fixed to said plunger head and supported thereby in fixed relation to each other, said compressor plunger being movable into and out of said movable mold chamber, a piercing member fixed to and projecting beyond the end and inner end compression surface of the compressor plunger and adapted to extend through the material in the mold chamber to form a perforation through said material, a plunger-operating shaft rotatively mounted and operatively connected with said plungers, and means for moving said mold chamber into the path of movement of each of said plungers successively.

8. In a machine of the class described, the combination of a movable mold forming a mold chamber having a discharge opening, a reciprocating plunger head, a compressor plunger and a discharging plunger both fixed to said plunger head and supported thereby in fixed relation to each other, said compressor plunger being movable into and out of said mold chamber, a piercing member fixed to and projecting beyond the end and inner end compression surface of the compressor plunger and adapted to extend through the material in the mold chamber to form a perforation through said material, means for introducing said plungers into said mold chamber successively, and means for alternately opening and closing the discharge opening of said mold chamber.

9. In a machine of the class described, the combination of a movable mold forming a mold chamber having a discharge opening, a reciprocating plunger head, a compressor plunger and a discharging plunger both fixed to said plunger head and supported thereby in fixed relation to each other, said compressor plunger being movable into and out of said mold chamber, a piercing member fixed to and projecting beyond the end and inner end compression surface of the compressor plunger and adapted to extend through the material in the mold chamber to form a perforation through said material, for discharging compressed material from said mold chamber, a plunger-operating shaft rotatively mounted and operatively connected with said plungers, means for moving said mold chamber into the path of movement of each of said plungers successively, and means for alternately opening and closing the discharge opening of said mold chamber.

10. In a machine of the class described, the combination of a movable mold forming a mold chamber having a discharge opening, a reciprocating plunger head, a compressor plunger and a discharging plunger both fixed to said plunger head and supported thereby in fixed relation to each other, a piercing member fixed to and projecting beyond the end and inner end compression surface of the compressor plunger and adapted to extend through the material in the mold chamber to form a perforation through said material, a plunger-operating shaft rotatively mounted, means for operatively connecting said shaft with said plungers, means for moving said mold chamber into the path of movement of each of said plungers successively, and a bed forming a closure for said mold chamber when the latter is in the path of movement of the compressor plunger, and adapted to permit the discharge of compressed molded material through the discharge opening of the mold chamber when said chamber is in position to admit the discharging plunger.

11. In a machine of the class described, the combination of a movable mold forming a mold chamber having a discharge opening, a reciprocating plunger head, a compressor plunger and a discharging plunger both fixed to said plunger head and supported thereby in fixed relation to each other, said compressor plunger being movable into and out of said mold chamber, a piercing member fixed to and projecting beyond the end and inner end compression surface of the compressor plunger and adapted to extend through the material in the mold chamber to form a perforation through said material, plunger-operating means adapted to introduce said plungers into said mold chamber successively, means for moving said mold chamber into the path of movement of each of said plungers successively, and means forming a closure for said mold chamber when the latter is in position to receive the compressor plunger, said closure-forming means being adapted to permit the discharge of compressed molded material through the open discharge opening of said mold chamber when said chamber is in position to receive the discharging plunger.

12. In a machine of the class described, the combination of a movable mold forming a mold chamber having a discharge opening, a reciprocating plunger head, a compressor plunger and a discharging plunger both fixed to said plunger head and supported thereby in fixed relation to each other, said compressor plunger being movable into and out of said mold chamber, a piercing member fixed to and projecting beyond the end and inner end compression surface of the compressor plunger and adapted to extend through the material in the mold chamber to form a perforation through said material, plunger-operating means operatively connected with said plunger head and adapted to introduce said plungers into said mold chamber successively, means for moving said mold chamber into the path of movement of each of said plungers successively, and a bed in supporting engagement with said mold and adapted to form a closure for said mold chamber when the latter is in position to receive the compressor plunger, said bed being adapted to permit the discharge opening of said mold chamber to be open to permit the discharge of compressed molded material when said mold chamber is in position to receive the discharging plunger.

13. In a machine of the class described, the combination of a movable mold forming a mold chamber having a discharge opening, a reciprocating plunger head, a compressor plunger and a discharging plunger both fixed to said plunger head and supported thereby in fixed relation to each other, said compressor plunger being movable into and out of said mold chamber, a piercing member fixed to and projecting beyond the end and inner end compression surface of the compressor plunger and adapted to extend through the material in the mold chamber to form a perforation through said material, plunger-operating means operatively connected with said plunger head and plungers, means for moving said mold chamber into the path of movement of each of said plungers successively, a stationary bed in engagement with said mold and adapted to form a closure for the discharge opening of said mold chamber when said chamber is in position to receive the compressor plunger, said bed being adapted to permit the opening of the said discharge opening when said mold chamber is in position to receive the discharging plunger, and means for securing said mold in the path of movement of each of said plungers successively.

14. In a machine of the class described, the combination of a mold forming a mold chamber having a discharge opening, a movable support for said mold, a compressor plunger movable into and out of said mold chamber, a piercing member fixed to and projecting beyond the end and inner end compression surface of the compressor plunger and adapted to extend through the material in the mold chamber to form a perforation through said material, plunger-operating means connected with said plunger head and plungers, means for operating said movable support intermittently, to cause said mold chamber to be moved into the path of movement of each of said plungers successively, a bed in engagement with the bottom of said mold and adapted to form a closure for said discharge opening when said mold chamber is in position to receive said compressor plunger, said bed being adapted to permit the said discharge opening to be open when said mold chamber is in discharging position, and means for removably securing said mold in the path of movement of each of said plungers successively.

15. In a machine of the class described, the combination of a mold forming a mold chamber having a discharge opening, a reciprocating plunger head, a compressor plunger and a discharging plunger both fixed to said plunger head and supported thereby in fixed relation to each other, said compressor plunger being movable into and out of said mold chamber, a piercing member fixed to and projecting beyond the end and inner end compression surface of the compressor plunger and adapted to extend through the material in the mold chamber to form a perforation through said material, means for introducing said plungers into said mold chamber successively, means adapted to form a closure for the discharge opening of said mold chamber when said chamber is in position to receive the compressor plunger, said closure-forming means being adapted to permit the discharge opening to be open when said mold chamber is in discharging position, means for removably holding said mold stationary in the path of movement of each of said plungers successively, and means for introducing material into the mold.

16. In a machine of the class described, the combination of a movable mold forming a mold chamber having a discharge opening, a reciprocating plunger head, a compressor plunger and a discharging plunger both fixed to said plunger head and supported thereby in fixed relation to each other, said compressor plunger being movable into and out of said mold chamber, a piercing member fixed to and projecting beyond the end and inner end compression surface of the compressor plunger and adapted to extend through the material in the mold chamber to form a perforation through said material, plunger-operating means operatively connected with said plunger head, an intermittently rotative mold-positioning member in engagement with said mold, means for rotating said intermittently rotative mold positioning member in a step-by-step manner, and means for automatically locking said intermittently rotative mold positioning member in different locked positions successively.

17. In a machine of the class described, the combination of a plurality of movable molds each forming a mold chamber, a reciprocating plunger head, a compressor plunger, a piercing member fixed to and projecting beyond the end and inner end compression surface of the compressor plunger and adapted to extend through the material in the mold chamber to form a perforation through said material, and a discharging plunger both fixed to said plunger head and supported thereby in fixed relation to each other, a plunger-operating shaft rotatively mounted and operatively connected with said plunger head, an intermittently movable mold-positioning member in engagement with each of said molds, means operatively connected with said plunger-operating shaft and with said intermittently movable mold-positioning member and adapted to actuate the latter intermittently, and means for locking said intermittently movable mold-positioning member in different locked positions successively.

18. In a machine of the class described, the combination of a plurality of pairs of plungers, each pair comprising a compressor plunger and a discharging plunger, a rotative plunger-operating shaft operatively connected with said plungers, a set of molds for each of said pairs of plungers, each of said molds forming a mold chamber having a discharge opening, a plurality of intermittently movable mold-positioning members each adapted to remain stationary during the movement of the other, and each being in operative engagement with a different set of said molds, actuating means operatively connected with said plunger-operating shaft and with said intermittently movable mold-positioning members respectively, for actuating said mold-positioning members intermittently, to cause each of said molds to be moved into the path of movement of each of a corresponding pair of said plungers successively, and means for opening and closing the discharge openings of said mold chambers.

19. In a machine of the class described, the combination of a plurality of pairs of plungers, each pair comprising a compressor plunger and a discharging plunger, a rotative plunger-operating shaft operatively connected with both pairs of said plungers, a set of molds for each pair of said plungers, each of said molds forming a mold chamber having a discharge opening, a plurality of intermittently rotative mold-positioning members each adapted to remain stationary during the movement of the other, and each being in operative engagement with a corresponding set of said molds, actuating means operatively connected with each of said intermittently rotative mold positioning members respectively, said mold-positioning means being adapted to cause each of said molds to be moved into the path of movement of each of a corresponding pair of plungers in predetermined order, and means for opening and closing the discharge openings of said mold chambers in predetermined order.

20. In a machine of the class described, the combination of a plurality of pairs of plungers, each pair comprising a compressor plunger and a discharging plunger, a rotative plunger-operating shaft operatively connected with both of said pairs of plungers and adapted to operate the same in a predetermined order, a set of molds for each pair of said plungers, each of said molds forming a mold chamber having a discharge opening, a plurality of intermittently rotative mold-positioning members each adapted to remain stationary during the movement of the other, and each being in operative engagement with a corresponding set of said molds, actuating means operatively connected with each of said intermittently rotative mold-positioning members and with said plunger-operating shaft, for actuating said mold positioning members in predetermined order intermittently, and stationary mold-engaging means adapted to open and close the discharge openings of said mold chambers in predetermined order.

21. In a machine of the class described, the combination of a plurality of pairs of plungers, each comprising a compressor plunger and a discharging plunger, a rotative plunger-operating shaft operatively connected with said plungers, a set of molds for each pair of said plungers, each of said molds forming a mold chamber having a discharge opening, a plurality of intermittently rotative mold-positioning members each adapted to remain stationary during the movement of the other, and each being in operative engagement with a corresponding set of said molds, actuating means operatively connected with said intermittently rotative mold-positioning members for actuating the same intermittently in predetermined order, means for locking each of said intermittently rotative mold-positioning members in predetermined order, and stationary mold-engaging means adapted to open and close the discharge openings of said mold chambers in predetermined order.

Signed at Chicago, in the county of Cook and State of Illinois this 25th day of January, 1923.

CLARENCE W. TARBET.